US012128413B2

(12) United States Patent
Fang et al.

(10) Patent No.: US 12,128,413 B2
(45) Date of Patent: Oct. 29, 2024

(54) TEST DEVICE

(71) Applicant: Zhejiang Orient Gene Biotech Co.,Ltd, Zhejiang (CN)

(72) Inventors: Jianqiu Fang, Zhejiang (CN); Jun Ling, Zhejiang (CN); Xiulong Ge, Zhejiang (CN); Fangzhou Xu, Zhejiang (CN)

(73) Assignee: ZHEJIANG ORIENT GENE BIOTECH CO., LTD, Zhejiang (CN)

( * ) Notice: Subject to any disclaimer, the term of this patent is extended or adjusted under 35 U.S.C. 154(b) by 81 days.

(21) Appl. No.: 17/877,231

(22) Filed: Jul. 29, 2022

(65) Prior Publication Data

US 2023/0087999 A1 Mar. 23, 2023

Related U.S. Application Data

(60) Provisional application No. 63/237,628, filed on Aug. 27, 2021.

(30) Foreign Application Priority Data

Aug. 31, 2021 (GB) ...................................... 2112371
Nov. 25, 2021 (CN) ......................... 202111416223.2
Nov. 25, 2021 (CN) ......................... 202122919517.9

(51) Int. Cl.
*B01L 3/00* (2006.01)

(52) U.S. Cl.
CPC ......... *B01L 3/508* (2013.01); *B01L 2300/041* (2013.01)

(58) Field of Classification Search
CPC .. B01L 3/5023; B01L 3/508; B01L 2200/025; B01L 2300/041;
(Continued)

(56) References Cited

U.S. PATENT DOCUMENTS 4,857,453 A 8/1989 Ullman et al.
5,073,484 A 12/1991 Swanson et al.
(Continued)

FOREIGN PATENT DOCUMENTS

CN 101650298 2/2010
CN 104730229 6/2015
(Continued)

*Primary Examiner* — Matthew D Krcha
*Assistant Examiner* — Austin Q Le
(74) *Attorney, Agent, or Firm* — Muncy, Geissler, Olds & Lowe, P.C.

(57) ABSTRACT

A test device includes a housing and a carrier detachable from the housing. The housing includes a socket, and the carrier contains a testing element, and the carrier along with the testing element therein is capable of being inserted into the housing through the socket. The housing includes a blocking structure and a locking structure. The blocking structure and the locking structure are integrated to form a locking component. When the carrier is inserted into the housing, and a position of the carrier is locked by the locking structure, the carrier is abutted against the blocking structure. The carrier keeps stable after being inserted into the housing; and the carrier is located in the same position for each insertion.

13 Claims, 7 Drawing Sheets

(58) Field of Classification Search

CPC ......... B01L 2300/046; B01L 2300/069; B01L 2300/0825; B01L 2400/0406; G01N 21/8483; G01N 21/77; G01N 33/53; G01N 33/5302; G01N 33/54388; G01N 2021/1725; G01N 2021/1731; G01N 2021/752; G01N 2021/7759; G01N 2021/7796; G01N 2201/0624

See application file for complete search history.

(56) References Cited

U.S. PATENT DOCUMENTS

| | | | |
|---|---|---|---|
| 5,119,831 | A | 6/1992 | Robin et al. |
| 5,185,127 | A | 2/1993 | Vonk |
| 5,275,785 | A | 1/1994 | May et al. |
| 5,416,000 | A | 5/1995 | Allen et al. |
| 5,504,013 | A | 4/1996 | Senior |
| 5,580,794 | A | 12/1996 | Allen |
| 5,602,040 | A | 2/1997 | May et al. |
| 5,622,871 | A | 4/1997 | May et al. |
| 5,654,162 | A | 8/1997 | Guire et al. |
| 5,656,503 | A | 8/1997 | May et al. |
| 5,686,315 | A | 11/1997 | Pronovost et al. |
| 5,766,961 | A | 6/1998 | Pawlak et al. |
| 5,770,460 | A | 6/1998 | Pawlak et al. |
| 5,916,815 | A | 6/1999 | Lappe |
| 5,976,895 | A | 11/1999 | Cipkowski |
| 6,140,136 | A | 10/2000 | Lee |
| 6,187,269 | B1 | 2/2001 | Lances et al. |
| 6,187,598 | B1 | 2/2001 | May et al. |
| 6,228,660 | B1 | 5/2001 | May et al. |
| 6,235,241 | B1 | 5/2001 | Catt et al. |
| 6,248,598 | B1 | 6/2001 | Bogema |
| 6,306,642 | B1 | 10/2001 | Nelson et al. |
| 6,352,862 | B1 | 3/2002 | Davis et al. |
| 6,372,515 | B1 | 4/2002 | Casterlin et al. |
| 6,379,620 | B1 | 4/2002 | Tydings et al. |
| 6,403,383 | B1 | 6/2002 | Casterlin et al. |
| 7,315,378 | B2 | 1/2008 | Phelan et al. |
| 2004/0082878 | A1 | 4/2004 | Baldwin et al. |
| 2009/0306543 | A1 | 12/2009 | Slowey et al. |
| 2010/0142898 | A1* | 6/2010 | Teo .................... H01R 13/6275 439/157 |
| 2021/0156792 | A1* | 5/2021 | Yan ...................... G01N 21/255 |
| 2021/0164910 | A1* | 6/2021 | Jones ................. G01N 33/5302 |

FOREIGN PATENT DOCUMENTS

| | | | |
|---|---|---|---|
| EP | 0833145 | B1 | 1/2003 |
| WO | WO2011048381 | A1 | 4/2011 |
| WO | WO2013131955 | A1 | 9/2013 |
| WO | WO2017216339 | A1 | 12/2017 |
| WO | WO2018183421 | A1 | 10/2018 |
| WO | WO2019023926 | A1 | 2/2019 |
| WO | WO2019083825 | A1 | 5/2019 |
| WO | WO2020019014 | A1 | 1/2020 |

* cited by examiner

TEST DEVICE

CROSS-REFERENCE TO RELATED APPLICATIONS

The present application claims priority to a Chinese prior application No. 2021114162232 and filed on Nov. 25, 2021, a Chinese prior application No. 2021229195179 and filed on Nov. 25, 2021, as well as a US prior provisional application No. 63/237,628 and filed on Aug. 27, 2021, and a UK prior provisional application No. 2112371.6 and filed on Aug. 31, 2021; the entire contents of the above application, including the description, accompanying drawings and claims of which are incorporated herein as a portion of the present invention.

TECHNICAL FIELD

The present invention relates to the technical field of in vitro rapid detection, and in particular to a test pen of a specific substance, for example, an electronic test pen for detecting COVID-19.

BACKGROUND

The following description is merely an introduction to the background art and not to limit the present invention.

At present, the test device for detecting the presence or absence of an analyte in sample is widely used in hospitals or homes, and such device for rapid diagnosis comprises one or more test strips, such as early pregnancy detection, drug abuse detection, etc. These test devices can obtain test results within one minute or about ten minutes at most, and have the advantages of easy operation and the like. An electronic reader is combined with a test carrier, for example, an analysis test strip to detect a concentration and/or an amount of an analyte in a fluid sample, capable of achieving the visual reading of test results.

U.S. Pat. No. 5,580,794 has disclosed a disposable integrated analytical reader and crossflow analytical test stripe to utilize an optical element in a reader to obtain a test result by measuring reflected light. However, there are certain shortcomings in the device. When multiple light-emitting elements irradiate on the corresponding areas on a narrow reagent strip, the light reflected or transmitted from the corresponding areas cannot irradiate onto one or more specific optical detectors only; moreover, the light emitted from a light source will possibly irradiate into the optical detector directly, thereby affecting the precision of the test result.

U.S. Pat. No. 7,315,378 has provided a method to solve the problem. A baffle is disposed between a light-emitting element and an optical detector to avoid that the light emitted from the light-emitting element irradiates onto the optical detector directly. However, these devices still need to be improved. Specifically, when multiple different tests need to be performed on a test stripe, the photoelectric detector is required to accurately reflect the signal change on a specific test area, thus avoiding interference from the light reflected from other non-test areas.

A Chinese patent No. CN101650298 has disclosed an analytical reader used with an analytical test strip. The reader includes one or more light sources; the light emitted from the light source is incident to at least two areas separated in space on the test stripe; one or more optical detectors are used to detect the light emitted from each of the two areas of the test stripe. To ensure the state that each light source only irradiates the corresponding areas in the test stripe, each light source is spaced optically with a lightproof baffle, and a slope component is disposed between the light source and the optical detector to avoid the direct exposure of the light from the light source on the optical detector. The test stripe is located above the reader light source instead of covering the optical detector such that the reader has a relatively larger volume; moreover, the distance between the light source and the optical detector needs to be controlled precisely. Too far distance will lead to a result that the optical detector cannot receive the light reflected by the test stripe.

A Chinese patent No. CN104730229 has disclosed an electronic detection device for the analysis and process of a test stripe for assay and detection, including a first separator and a second separator which are crossed; the first separator includes a light source separator and an anti-scattering separator. The light source separator is used to separate multiple lights sources into two groups in the position of the light source, and to separate the testing area of the test stripe from the blank area thereof; the anti-scattering separator is used to separate the testing area of the test stripe from the blank area thereof; the second separator is used to separate the light source from the optical detector. Such a configuration can prevent the mutual interference between the blank area and the testing area as well as between the light emission area and the receiving area.

The test device disclosed above can be used for self-detection to obtain visual reading, but there are still some problems, for example, the above device may be impractical or infeasible in the real detection of a sample of infectious diseases. This is because the sample of infectious diseases needs to be collected separately and is different from electronic detector for early pregnancy which allows direct sample collection.

Therefore, it needs to provide an electronic test device suitable for a sample of an infectious disease, capable of obtaining visual reading.

SUMMARY

The objective of the present invention is to provide a test device, thus solving the problem proposed in the background art.

To achieve the above objective, the technical solution of the present invention is as follows: a test device is provided, including a housing and a carrier, wherein the housing and the carrier are detachable; the housing is provided with a socket, and the carrier contains a testing element, and the carrier along with the testing element therein is capable of being inserted into the housing through the socket;

- where the housing is provided with a locking structure; the locking structure includes a blocking structure and a locking structure; the blocking structure and the locking structure are integrated; when the carrier is inserted into the housing, and a position of the carrier is locked by the locking structure, the carrier is abutted against the blocking structure.

In some embodiments, the blocking structure is an elastic compressible structure; when the carrier is inserted into the housing, the blocking structure is compressed. When the carrier is separated from the housing automatically, unlocking is performed such that the elastic blocking structure enables the carrier to be popped out of the housing via elasticity.

In some embodiments, the step of abutting the carrier against the blocking structure includes that the carrier is directly and indirectly abutted against the blocking structure.

In some embodiments, the test device further includes an unlocking structure, and the unlocking structure is exposed outside the housing.

In some embodiments, the unlocking structure is disposed on the locking structure; the locking structure, the blocking structure and the unlocking structure are integrated to form a locking component.

In some embodiments, the locking component includes a buckle, and the carrier is provided with a slot, and the buckle is capable of being buckled into the slot, thus achieving the locking of the carrier.

In some embodiments, the locking component is provided with a supporting point structure; the buckle is connected with the supporting point structure; the unlocking structure and the buckle are respectively located at both sides thereof; the supporting point structure is located between the unlocking structure and the buckle.

In some embodiments, the housing is provided with a first fixed column; the first fixed column is used to fix the locking component; the supporting point structure of the locking component is connected with a first connecting structure; the first connecting structure is connected with a first hollow body; the first hollow body is internally provided with a hole externally paired with the first fixed column such that the first hollow body is capable of being sleeved on the first fixed column.

In some embodiments, the housing is provided with a second fixed column; the first hollow body is connected with a second connecting structure; the second connecting structure is connected with a second hollow body; the second hollow body is internally provided with a hole externally paired with the second fixed column such that the second hollow body is capable of being sleeved on the second fixed column.

In some embodiments, a position where the buckle is buckled into the slot is a buckling position; a bulge structure is disposed on one side of the buckle facing away from the buckling position; when the buckle has excessive deformation, the bulge structure on the buckle is capable of being abutted against an inner wall of the housing.

In some embodiments, the unlocking structure includes an unlocking portion and a pressing portion; the pressing portion is disposed on the unlocking portion.

In some embodiments, the unlocking portion is arc-shaped; the arc-shaped unlocking portion includes an inner side with an arc center facing the unlocking structure and an outer side with an arc center facing the unlocking structure.

In some embodiments, a cross section of the unlocking portion is divided into a first edge, a second edge and a middle portion; the unlocking structure with the arc center facing the inner side of the unlocking portion is characterized in that: a distance from one of the first edge or the second edge to the center is the shortest, and a distance from the other of the first edge and the second edge to the center is the farthest; and a distance from the middle portion to the center ranges between a distance from the first edge to the center and a distance from the second edge to the center;

and a distance from the middle portion to the center is the farthest; the distance from the first edge to the center and the distance from the second edge to the center are both smaller than the distance from the middle portion to the center.

In some embodiments, when the distance from one of the first edge or the second edge to the center is the shortest, and the distance from the other of the first edge and the second edge to the center is the farthest; and the distance from the middle portion to the center ranges between the distance from the first edge to the center and the distance from the second edge to the center;

and when the test pen is placed horizontally on a table, a tangent line of an edge position of an arc formed by the first edge, the middle portion and the second edge is kept vertical or near vertical to the horizontal plane.

In some embodiments, the unlocking structure includes an unlocking portion and a pressing portion; the pressing portion is disposed on the unlocking portion; and a reinforced structure is disposed at a position where the unlocking portion and the supporting point structure are connected.

In some embodiments, at least one surface on the unlocking portion is coplanar with a surface on the buckle;

the unlocking portion includes a first side face and a second side face; the first side face and the second side face are respectively located at a position close to the second edge and the first edge; and the buckle further includes a third side face and a fourth side face;

where one of the first side face and the second side face of the unlocking portion are kept in the same plane with one of the third side face and the fourth side face of the buckle; the first side face and the second side face of the unlocking portion are kept in the same plane with the third side face and the fourth side face of the buckle; alternatively, the second side face of the unlocking portion and the third side face of the buckle are in the sample plane; the first side face of the unlocking portion and the fourth side face of the buckle are not in the same plane.

In some embodiments, the test pen further includes an elastic structure; the elastic structure is disposed between the blocking structure and the carrier.

In some embodiments, the elastic structure is independent, or, the elastic structure and the carrier are integrated.

In some embodiments, the locking structure, the elastic structure, the blocking structure and the unlocking structure are integrated to form a locking component.

In some embodiments, the locking structure, the elastic structure, the blocking structure and the unlocking structure are integrated; the locking component is made of plastic in a way of integrated injection molding.

In some embodiments, the elastic structure is a component having a certain thickness and being in a bending shape, and a gap is retained between the bending portion thereof.

To sum up, the present invention has the following beneficial effects: the test device of the present invention is very convenient for an operator to mount, insert and take out of the testing element. The carrier is provided with a holding portion convenient for the operating personnel to hold firmly. The carrier keeps stable after being inserted into the housing; and the carrier is located in the same position for each insertion, which can ensure that the first electrode and the second electrode are always in contact with a labeling area of the testing element during each insertion such that test results can be read each time. The unlocking structure of the locking structure is exposed outside the housing, which is convenient for the operating personnel to directly unlock the carrier from the outside. The buckle of the locking structure is less liable to fracture and thus, has long service life. The arc-shaped unlocking portion may partially resolve force on an arc-shaped cross section such that the arc-shaped unlocking portion is not prone to fracture, and more adhered onto the housing. The pressing portion has an arc-shaped outer contour; the arc-shaped pressing portion greatly improves the comfort level of the compression. The unlocking structure of the present invention has a higher locking feedback sensitivity; and appropriate intensity of compression can achieve the unlocking of the carrier. The test device is easy to be assembled and more convenient and more excellent in performance.

BRIEF DESCRIPTION OF DRAWINGS

FIG. 10(*a*) is a sectional view of a locking component; and FIG. 10(*b*) is a sectional view of another locking component.

DETAILED DESCRIPTION OF EMBODIMENTS

Figure 1:
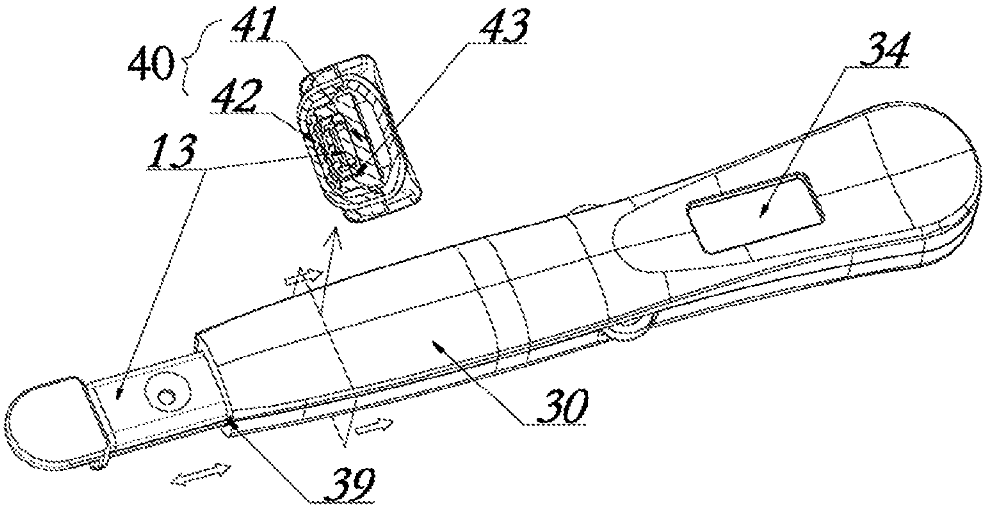
FIG. 1 is a schematic diagram showing an overall structure of a test pen.
Figure 2:
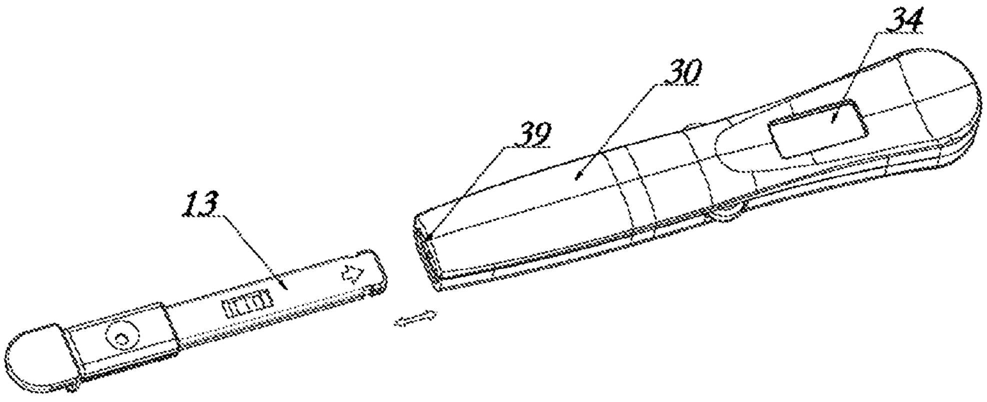
FIG. 2 is a schematic diagram showing that a carrier in the test pen is taken out.
Figure 3:
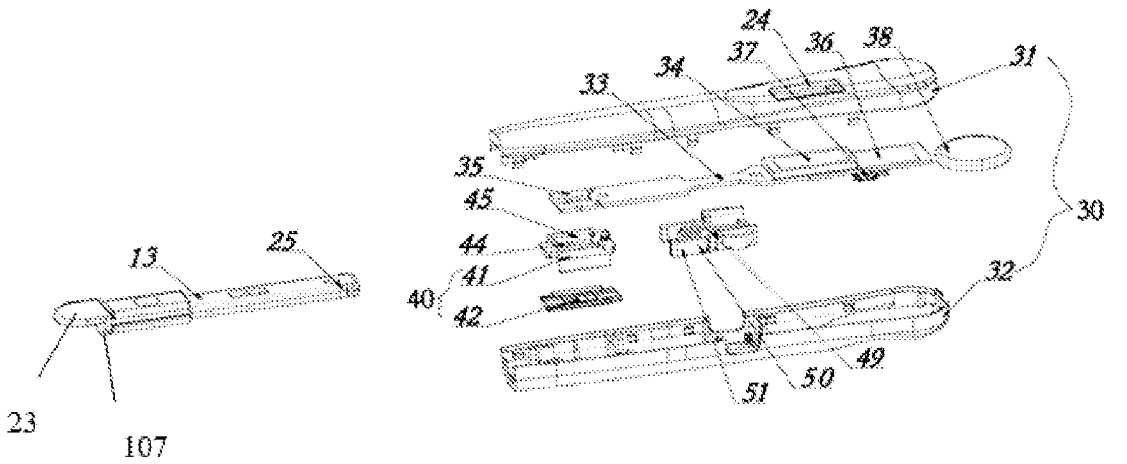
FIG. 3 is a schematic diagram showing that a housing is in an explosive state in FIG. 2.

The structures or technical terms used in the present invention are further described in the following. Unless otherwise indicated, they are understood or interpreted according to ordinary terms and definitions in the art.

Detection

Detection denotes assaying or testing whether a substance or material exists, for example, but not limited to, chemicals, organic compounds, inorganic compounds, metabolites, drugs or drug metabolites, organic tissues or metabolites of organic tissues, nucleic acid, proteins or polymers. Moreover, detection denotes testing the number of a substance or material. Further, assay also denotes immunoassay, chemical detection, enzyme detection and the like.

Samples

The samples that can be detected by the detection apparatus or samples collected in the present invention include biological liquid (e.g. case liquid or clinical samples). These samples or specimens can be derived from solid or semi-solid samples, including fecal materials, biological tissues and food samples. Solid or semi-solid samples can be converted to liquid samples using any appropriate method, such as mixing, crushing, macerating, incubating, dissolving or digesting the solid samples in a suitable solution (such as water, phosphate solution or other buffer solutions) with the enzymolysis. "Biological samples" include samples from animals, plants and food, for example, including urine, saliva, blood and components thereof, spinal fluid, vaginal secretion, semen, faeces, sweat, secreta, tissues, organs, tumors, cultures of tissues and organs, cell culture and medium from human or animals. The preferred biological sample is urine, preferably, the biological sample is saliva. Food samples comprise food processed substances, final products, meat, cheese, liquor, milk and drinking water; and plant samples comprise samples from any plants, plant tissues, plant cell cultures and media. "Environmental samples" are derived from the environment (for example, liquid samples, wastewater samples, soil texture samples, underground water, seawater and effluent samples from lakes and other water bodies). Environmental samples may further include sewage or other waste water.

Any analyte can be detected using the appropriate detecting element or testing element of the present invention. Preferably, the present invention is used to detect small drug molecules in saliva and urines. Of course, any form of samples, either initially solid or liquid, can be collected by the collection apparatus in the invention, as long as the liquid or liquid samples can be absorbed by the absorbing element. The absorbing element is generally prepared from a water absorbent material and is initially dry. It can absorb liquid or fluid specimens by capillary or other characteristics of the absorbing element material. The absorbent material can be any liquid absorbing material such as sponge, filter paper, polyester fiber, gel, non-woven fabric, cotton, polyester film, yarn, etc. Of course, the absorbing element is not necessarily prepared by an absorbent material but may be prepared by a non-water absorbent material. But the absorbing element has pores, threads, and cavities and specimens may be collected on these structures.

Downstream and Upstream

Downstream and upstream are divided according to the flow direction of liquid, and generally, liquid flows from upstream to downstream regions. The downstream region receives liquid from the upstream region, and also, liquid can flow to the downstream region along the upstream region. Here the regions are often divided according to the flow direction of liquid. For example, on some materials that use capillary force to promote liquid to flow, liquid can flow against the gravity direction, at this time, the upstream and downstream regions are still divided according to the flow direction of liquid.

Gas Flow or Liquid Flow

Gas flow or liquid flow means that liquid or gas can flow from one place to another place. The flow process may pass through some physical structures, to play a guiding role. The "passing through some physical structures" here means that liquid passes through the surface of these physical structures or their internal space and flows to another place passively or actively, where passivity is usually caused by external forces, such as the flow of the capillary action. The flow here may mean flow of gas or liquid due to self-action (gravity or pressure), or passive flow. Here, the flow does not mean that a liquid or a gas is necessarily present, but indicates a relationship or state between two objects under some circumstances. In case of presence of liquid, it can flow from one object to another. Here it means the state in which two objects are connected. In contrast, if there exists no gas flow or liquid flow state between two objects, and liquid exists in or above one object but cannot flow into or on another object, it is a non-flow, non-liquid or non-gas flow state.

Testing Element

The "testing element" used herein refers to an element that can be used to detect whether a sample or a sample contains an interested analyte. Such testing can be based on any technical principles, such as immunology, chemistry, electricity, optics, molecular science, nucleic acids, physics, etc. The testing element can be a lateral flow test strip that can detect a variety of analytes. Of course, other suitable testing elements can also be used in the present invention.

Various testing elements can be combined for use in the present invention. One form of the testing elements is test paper. The test papers used for analyzing the analyte (such as drugs or metabolites that show physical conditions) in samples can be of various forms such as immunoassay or chemical analysis. The analysis mode of non-competition law or competition law can be adopted for test papers. A test paper generally contains a water absorbent material that has a sample application area, a reagent area and a testing area. Samples are added to the sample application area and flow to the reagent area through capillary action. If analyte exists in the reagent area, samples will bind to the reagent. Then, samples continue to flow to the testing area. Other reagents such as molecules that specifically bind to analyte are fixed in the testing area. These reagents react with the analyte (if any) in the sample and bind to the analyte in this area, or bind to a reagent in the reagent area. Marker used to display the detection signal exists in the reagent area or the detached mark area.

Typical non-competition law analysis mode: if a sample contains analyte, a signal will be generated; and if not, no signal will be generated. Competition law: if no analyte exists in the sample, a signal will be generated; and if analyte exists, no signal will be generated.

The testing element can be a test paper, which can be water absorbent or non-absorbing materials. The test paper can contain several materials used for delivery of liquid samples. One material can cover the other material. For example, the filter paper covers the nitrocellulose membrane. One area of the test paper can be of one or more materials, and the other area uses one or more other different materials. The test paper can stick to a certain support or on a hard surface for improving the strength of holding the test paper.

Analyte is detected through the signal generating system. For example, one or more enzymes that specifically react with this analyte is or are used, and the above method of fixing the specifically bound substance on the test paper is used to fix the combination of one or more signal generating systems in the analyte testing area of the test paper. The substance that generates a signal can be in the sample application area, the reagent area or the testing area, or on the whole test paper, and one or more materials of the test paper can be filled with this substance. The solution containing a signifier is added onto the surface of the test paper, or one or more materials of the test paper is or are immersed in a signifier-containing solution, and the test paper containing the signifier solution is made dry.

Each area of the test paper can be arranged in the following way: sample application area, reagent area, testing area, control area, area determining whether the sample is adulterated, and liquid sample absorbing area. The control area is located behind the testing area. All areas can be arranged on a test paper that is only made of one material. Also, different areas may be made of different materials. Each area can directly contact the liquid sample, or different areas are arranged according to the flow direction of liquid sample; and a tail end of each area is connected and overlapped with the front end of the other area. Materials used can be those with good water absorption such as filter papers, glass fibers or nitrocellulose membranes. The test paper can also be in the other forms.

The nitrocellulose membrane test strip is commonly used, that is, the testing area includes a nitrocellulose membrane on which a specific binding molecule is fixed to display the detecting result; and other test strips such as cellulose acetate membrane or nylon membrane test strips can also be used. For example, the test strips and similar apparatuses with test strips disclosed in the following patents can be applied to the testing elements or detecting apparatuses in this invention for analyte detection, such as the detection of the analyte in the samples: U.S. Pat. Nos. 4,857,453; 5,073,484; 5,119,831; 5,185,127; 5,275,785; 5,416,000; 5,504,013; 5,602,040; 5,622,871; 5,654,162; 5,656,503; 5,686,315; 5,766,961; 5,770,460; 5,916,815; 5,976,895; 6,248,598; 6,140,136; 6,187,269; 6,187,598; 6,228,660; 6,235,241; 6,306,642; 6,352,862; 6,372,515; 6,379,620, and 6,403,383 The test strips and similar device provided with a test strip disclosed in the above patent literatures may be applied in the testing element or detecting apparatus of the present invention for the detection of an analyte, for example, the detection of an analyte in a sample.

The test strips used in the present invention may be those what we commonly called lateral flow test strip, whose specific structure and detection principle are well known by those with ordinary skill in the art. Common test strip includes a sample collecting area or a sample application area, a labeled area, a testing area and a water absorbing area; the sample collecting area includes a sample receiving pad, the labeled area includes a labeled pad, the water absorbing area may include a water absorbing pad; where the testing area includes necessary chemical substances for detecting the presence or absence of analyte, such as immunoreagents or enzyme chemical reagents. The nitrocellulose membrane test strip is commonly used, that is, the testing area includes a nitrocellulose membrane on which specific binding molecule is fixed to display the detecting result; and other test strips such as cellulose acetate membrane or nylon membrane test strips can also be used. Of course, in the downstream of the testing area, there may also be a detecting result control area; generally, test strips appear on the control area and the testing area in the form of a horizontal line, that is a detection line or a control line, and such test strips are conventional. Of course, they can also be other types of test strips using capillary action for detection. In addition, there are often dry chemical reagent components on the test strip, for example immobilized antibody or other reagents. When the test strip meets liquid, the liquid flows along the test strip with the capillary action, and the dry reagent components are dissolved in the liquid, then the liquid flows to the next area, the dry reagents are treated and reacted for necessary detection. The liquid flow mainly relies on the capillary action. Here, all of them can be applied to the test device of the present invention or can be disposed in contact with the liquid samples in the detection chamber or used to detect the presence or absence of analyte in the liquid samples that enter the detection chamber, or the quantity thereof.

Figure 4:
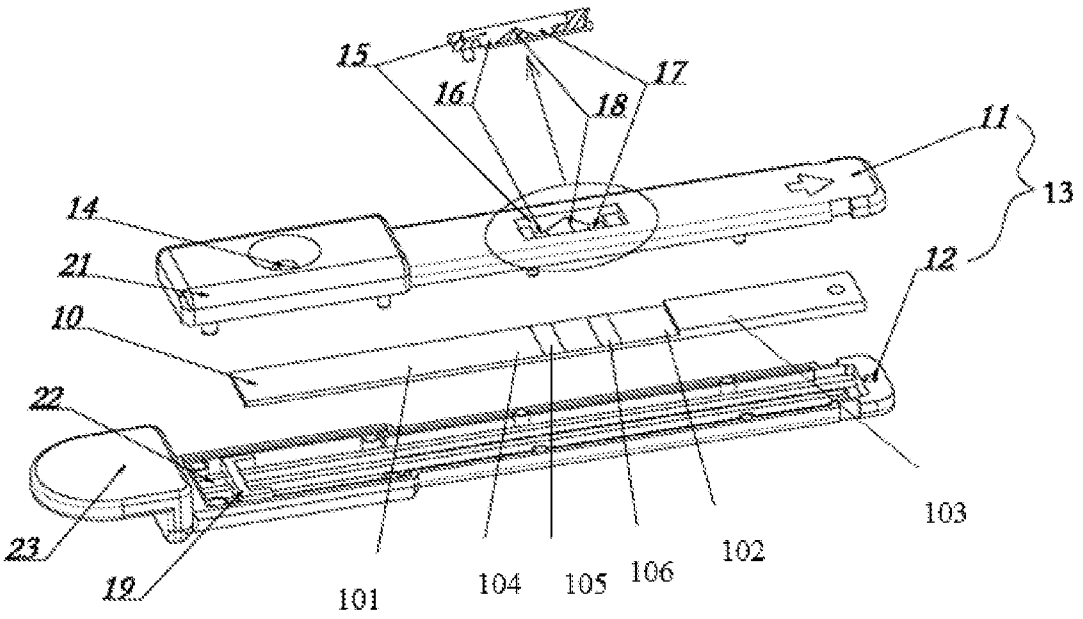
FIG. 4 is an explosive diagram of the carrier.

In addition to the foregoing test strip or lateral flow test strip which is used to contact with the liquid to test whether the liquid samples contain analytes. In some preferred embodiments, the testing element may be also disposed on some carriers, for example, in the present invention, as shown in FIG. 4, to cooperate with the use of the test device, the testing element 10 is disposed in the carrier 13 and may move with the carrier 13. The testing element 10 in the present invention may be selected from test strips, generally, the test stripe includes a sample application area 101, a labeling area 104 and a testing area 102; the sample application area is located upstream of the labeling area; and the labeling area 104 is located upstream of the testing area 102. When the testing element 10 is mounted in the carrier 13 well, a loading hole 14 is disposed on the carrier 13 in a position corresponding to the sample application area of the testing element 10, and a hollow hole 15 is disposed on the carrier 13 in a position corresponding to the testing area of the testing element 10, and the hollow hole 15 enables a portion of the testing area of the testing element 10 to be exposed. Specifically, the hollow hole 15 includes a first exposure hole 16 and a second exposure hole 17; a partition 18 is disposed between the first exposure hole 16 and the second exposure hole 17, and one side of the partition 18 away from the testing element 10 is sharp. In this way, the two exposure holes 16 and 17 are respectively exposed on the test area 105 and a test result controlling area 106 on the testing element. Generally, both the testing area and the test result controlling area exist linearly.

Due to the use of electronic reading, a LED light-emitting element generally emits light and irradiates on the test area 105 and the controlling area 106, and PD receives the light emitted from the test area 105 and the controlling area 106 of the testing element, then the light is transformed into a test result via an electrical signal. A partition is disposed at the window to avoid that the incident light is not desired to irradiate on the controlling area when irradiates on the testing area. In this way, the PD only receives the reflected light or refracted light of the testing area instead of the light from the controlling area, thus being free of the interference of light from the controlling area, thereby achieving more accurate test results. Detailed description will be set forth below in combination with the practical optical scale equipment.

Analyte

Examples that can use the analyte related to this invention include small-molecule substance, including drugs (such as drug abuse). "Drug of Abuse" (DOA) refers to using a drug (playing a role of paralyzing the nerves usually) not directed to a medical purpose. Abuse of these drugs will lead to physical and mental damage, produce dependency, addiction and/or death. Examples of DOA include cocaine, amphetamine AMP (for example, Black Beauty, white amphetamine table, dextroamphetamine, dextroamphetamine tablet, and Beans); methylamphetamine MET (crank, methamphetamine, crystal, speed); barbiturate BAR (e.g., Valium□, Roche Pharmaceuticals, Nutley, and New Jersey); sedative (namely, sleep adjuvants); lysergic acid diethylamide (LSD); depressor (downers, goofballs, barbs, blue devils, yellow jackets, methaqualone), tricyclic antidepressants (TCA, namely, imipramine, Amitryptyline and Doxepin); methylene dioxymetham-phetamine (MDMA); phencyclidine (PCP); tetrahydrocannabinol (THC, pot, dope, hash, weed, and the like). Opiates (namely, morphine MOP or, opium, cocaine COC; heroin, oxycodone hydrochloride); antianxietics and sedative hypnotics, antianxietics are drugs for alleviating anxiety, tension, fear, stabilizing emotion and having hypnosis and sedation, including benzodiazepines (BZO), non-typical BZs, fusion dinitrogen NB23Cs, benzoazepines, ligands of a BZ receptor, open-loop BZs, diphenylmethane derivatives, piperazine carboxylates, piperidine carboxylates, quinazoline ketones, thiazine and thiazole derivatives, other heterocyclic, imidazole sedatives/analgesics (e.g., oxycodone hydrochloride OXY, metadon MTD), propylene glycol derivatives, mephenesin carbamates, aliphatic compounds, anthracene derivatives, and the like. The test device of the present invention may be also used for detecting drugs which belong to medical use but is easy to be taken excessively, such as tricyclic antidepressants (Imipramine or analogues), acetaminophen and the like. These medicines will be resolved into micromolecular substances after being absorbed by human body, and these micromolecular substances will exist in blood, urine, saliva, sweat and other body fluids or in some of the body fluids.

For example, the analyte detected by the present invention includes but not limited to creatinine, bilirubin, nitrite, proteins (nonspecific), hormones (for example, human chorionic gonadotropin, progesterone, follicle-stimulating hormone, etc.), blood, leucocyte, sugar, heavy metals or toxins, bacterial substances (such as, proteins or carbohydrates against specific bacteria, for example, *Escherichia coli.* 0157:H7, *Staphylococcus, Salmonella, Fusiformis* genus, *Camyplobacter* genus, *L. monocytogenes, Vibrio*, or *Bacillus cereus*) and substances associated with physiological features in a urine sample, such as, pH and specific gravity. The chemical analysis of any other clinical urine may be conducted by means of a lateral cross-flow detection way and in combination with the device of the present invention.

Flow of Liquid

Generally, the flow of liquid means that liquid flows from one place to another place. Under normal circumstances, liquid flows from a high place to a low place due to gravity in the natural world. The flow of liquid herein relies on an external force, i.e. gravity, which can be called a flow due to gravity. In addition to gravity, liquid can also flow from a low place to a high place by overcoming the gravity. For example, liquid flows from a low place to a high place due to extraction, oppression or pressure, or by overcoming its gravity due to pressure.

Carrier of the Testing Element

The testing element 10 is basically a disposable consumable; it is thin and small, not easy to be held and prone to buckling. To make the test device achieving multiple detection of samples, the testing element 10 in the test device should be replaceable, which requests the operator to take out the testing element 10 in the test device. For the convenience of mounting and taking out the testing element 10, the test device includes a carrier 13 for bearing the testing element; the testing element 10 is mounted in the carrier 13 such that the testing element 10 may move with the carrier 13. The carrier 13 is made of a hard material, for example, plastic, which is convenient for the operator to mount or take out the carrier 13. In this way, the carrier may be inserted into the housing 30; the housing includes an electronic component capable of reading the test result in the testing area of the testing element in the carrier. Such reading is generally achieved by an optical principle, which is similar to the reading method of the current electronic detector for early pregnancy. These methods have been described in CN104730229, CN101650298, US558079 and U.S. Pat. No. 7,315,378 in detail.

In some embodiments, the carrier has a locking position in the housing; the carrier is in the locking position when inserted into the housing 30; in case of being unlocked, the carrier has a pop-up element capable of enabling the carrier to be separated from the housing automatically.

In some embodiments, the carrier 13 is provided with a loading hole 14; the loading hole 14 enables the carrier 13 to have the ability of retaining samples, in particular to some solid, semi-solid samples or liquid samples. In this example, the loading hole 14 is in a shape of an open truncated cone to enhance the ability of the loading hole 14 to accommodate samples to some extent. In some embodiments, after the carrier is inserted into the housing, sample loading is performed; samples are added via the loading hole 13 on the carrier, or, samples are firstly added to the loading hole 13, and then the carrier is inserted into the housing and is in the locking position with the housing.

Preferably, the carrier 13 includes a first cover plate 21 and a second cover plate 22; the first cover plate 21 and the second cover plate 22 may be covered together to clamp the testing element 10 therebetween, thus achieving the fixation of the testing element 10 in the carrier 13. The first cover plate 21 and the second cover plate 22 are detachably connected, which is convenient for the operator to replace the testing element 10 in the carrier 13. Alternatively, a plurality of carrier elements are provided. Each carrier element contains a test stripe. In this way, the carrier may be continuously inserted into the housing to read a test result. In this way, a housing may be provided with a plurality of carriers; samples are collected in need of detection, and samples are dropwisely added to the loading hole 13 of the carrier, and then inserted into the housing such that the carrier is in the locking position. After completing the reading of the test result, the carrier is automatically popped out of the housing. In this way, multiple detection may be performed, for example, test for coronavirus antigens may achieve multiple different tests.

Further, a first limiting structure 19 for fixing the carrier 13 is disposed in the first plate 21 and the second cover plate 22. The first limiting structure 19 may be a bulge, a groove and other structures. The main purpose of the first limiting structure is to limit the testing element 10 to move in the carrier 13 such that the sample application area of the testing element 10 is always aligned at the loading hole 14, and the hollow hole 15 is always aligned at the testing area of the testing element 10.

Preferably, for the convenient for the operator to hold the carrier, the first cover plate 21 and/or the second cover plate 22 is provided with a holding portion 23. In this present invention, the holding portion 23 is convenient for the operator to hold it with two fingers, and the holding portion 23 is provided with an antislip strip used to increase friction. In this example, referring to FIG. 4, since the antislip strip is disposed on the lower side of the holding portion 23, the antislip strip is not displayed on the visual angle of FIG. 4. In some other embodiments, the holding portion and an upper cover 21 of the carrier are in the same plane, and the thickness is the same as that of the second cover plate; therefore, there is a space 107 between the holding portion and the second cover plate 22. The design has the following purpose, when the carrier is placed on a plane, the space 107 is convenient for the operator to hold it with hands such that the carrier is conveniently inserted into the housing.

Figure 5:
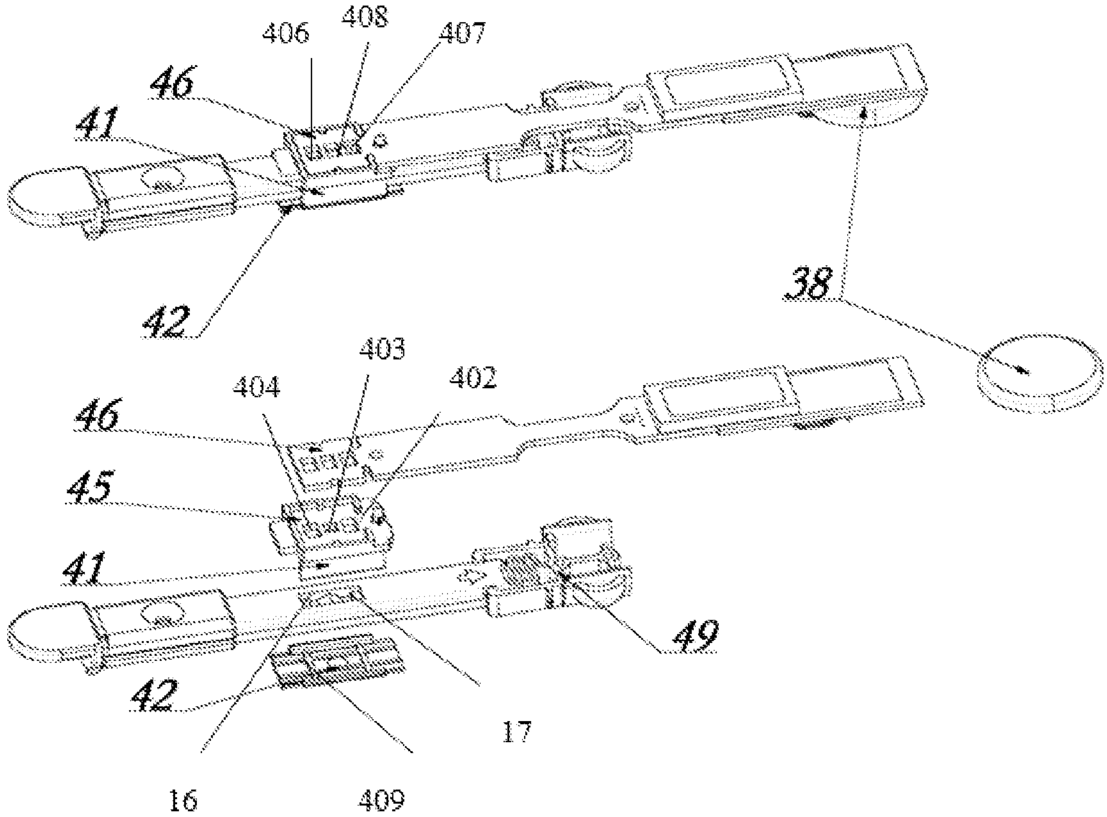
FIG. 5 is a schematic diagram showing an internal structure after the housing of the test pen is hidden and corresponding explosive diagram.
Figure 6:
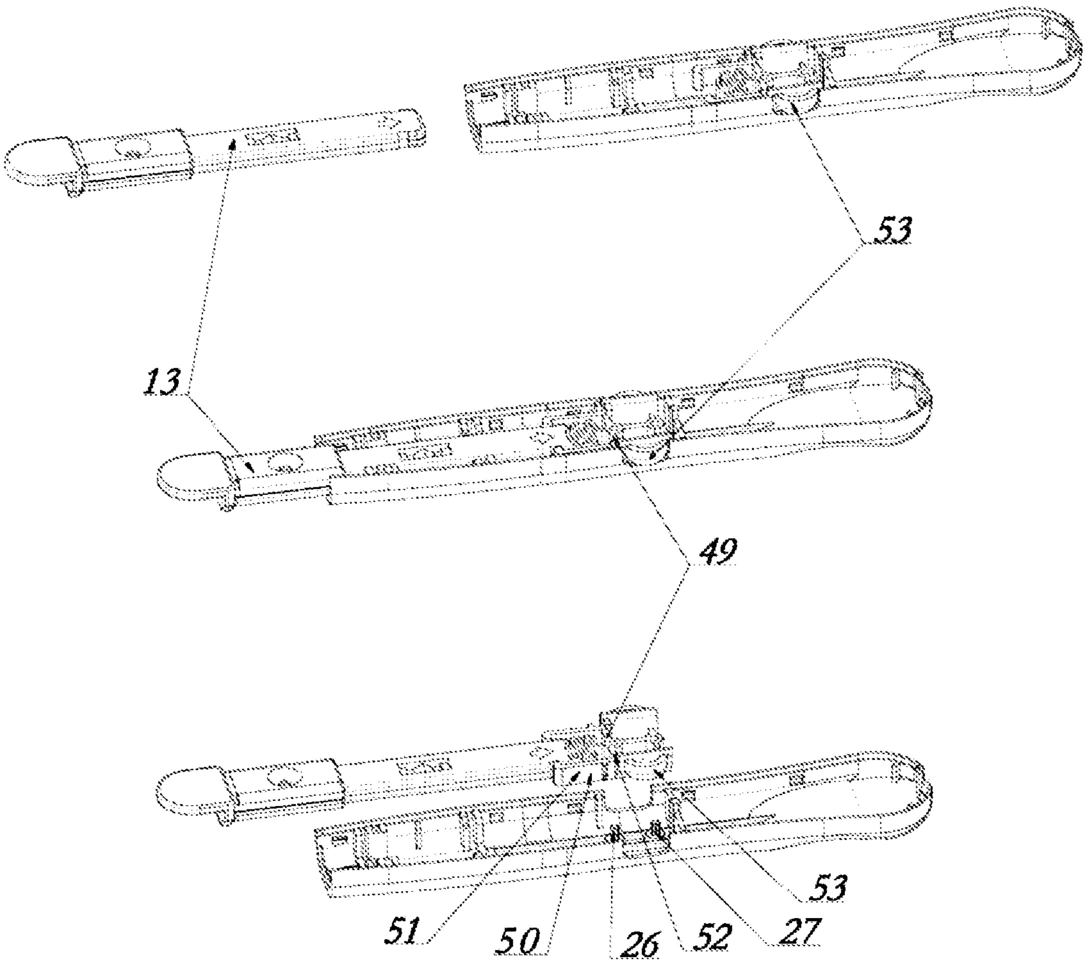
FIG. 6 is a schematic diagram showing that the carrier is fixed on a second housing via a locking component.

In some embodiments, the first cover plate 21 is designed hollow in a position corresponding to the testing area of the testing element, which is different from the design of a common carrier. Basically, the test area 105 and the test controlling area 106 are exposed respectively through the hollow structures 16,17. It can be seen from FIG. 4 that one partition in the hollow area covers the area between the test area 105 and the test controlling area 106. The area is covered by a partition element 18. For example, as shown in FIG. 5, the present invention further includes a second limiting structure 45 located on the hollow structure. On the one hand, the limiting structure allows the hollow structure of the carrier to correspond to the light-emitting element on the PCB board 46 and PD receiving an optical signal; on the other hand, the limiting structure also plays the role of blocking external light from entering into the hollow structure to disturb the test result. Meanwhile, in this way, the carrier is inserted into the housing and in a stable position; and the light-emitting elements 406 and 407 on the PCB board 46 correspond to the test area 105 and the test result controlling area 106 only when the carrier is inserted into the housing. Meanwhile, the light-emitting element 406, the PD408 receiving optical signal and another light-emitting element 407 are respectively surrounded by the corresponding holes 404, 403 and 402 on the second limiting structure 45. In this way, the light emitted by the light-emitting element 406 irradiates on the test area 105 of the testing element in the carrier, and then the light reflected by the test area 105 is received by the PD408 located between the two light-emitting elements. Similarly, the light emitted by the light-emitting element 407 irradiates on the test result controlling area 106; the reflected light on the controlling area 106 is received by the PD408 receiving optical signal. In this way, the partition 18 on the carrier is similar to a structure whose cross section is an isosceles triangle (FIG. 4), covering on an area between the test area 105 and the controlling area 106 on the testing area 102 of the testing element. In this way, interference is reduced while reading the test result.

The second limiting structure 45 has a limiting piece 42 and is matched with the first limiting element 42 (as shown in the upper figure of FIG. 5). The carrier needs to pass through the space formed by the first limiting structure 42 and the second limiting structure 45 when inserted into the housing. The shape and size of the space are matched with the shape surrounded by the upper cover and lower cover outside the testing area 102 of the carrier in size. When the carrier is inserted, the carrier should be in the correct position. Because the test area 105 on the testing area 102 needs to be aligned at the light-emitting element 406, if there exists a deviation in the position, the light emitted by the light-emitting element cannot irradiate on the detecting area, leading to the incorrect test result obtained.

Housing

Housing is a shell of the test device, namely, the portion of the test device directly exposed in the air. The housing 30 is provided with a socket 39, and the carrier 13 along with the testing element 10 therein is capable of being inserted into the housing 30 through the socket 39. The testing area 102 of the testing element 10 in the carrier is aligned at an electronic reading testing element for reading test results in the housing, for example, a light-emitting element and a PD element reeving reflected light, thus reading a detection or test result of an analyte.

The housing 30 is removable. In this example, the housing includes a first housing 31 and a second housing 32. The first housing 31 and the second housing 32 are assembled to form an inner space. Other components of the test device may be mounted in the inner space, for example, a PCB circuit board 33; a display screen 34 is mounted on the PCB circuit board 33; a first end 35 of the PCB circuit board 33 is provided with a first LED light-emitting element 406 and a second LED light-emitting element 407. A first electrode and a second electrode may extend into a first exposure hole 16 and a second exposure hole 17 to correspond to the testing area of the testing element 10. The emitted light irradiates on the testing area of the testing element; and a receiving element is also disposed on the PCB circuit board 33, for example, a PD receiving element 408 receives the light from the testing element; the test value is displayed on the display screen 34 by calculation. The housing is provided with a display screen hole 24 corresponding to the position of the display screen 34, and the display screen 34 is exposed by the display screen hole 24.

Preferably, a second end 36 (another end away from the first end 35) of the PCB circuit board 33 is provided with a battery clamp 37; the battery clamp 37 is used for mounting a cell 38; the cell 38 is preferably a button cell. Further, a first end 35 provided with a first electrode and a second electrode of the PCB circuit board 33 is generally close to the side of the socket 39 of the housing 30; the second end 36 mounted with the cell 38 on the PCB circuit board 33 is away from the side of the socket 39 of the housing 30; the battery clamp 37 is preferably disposed on one side of the PCB circuit board 33 facing away from the display screen 34.

In some embodiments, how to judge whether the carrier is inserted into the housing and when to start the reading procedure or booting procedure may be achieved by an optical element 406. When the carrier is not inserted into the housing, the space formed between the two limiting structures is not blocked; after booting, the light emitted by the optical element 406 irradiates on the inner surface 409 of the first limiting element 42; the inner surface is generally a black surface. In this way, the reflected light is received by PD to form a signal to be transmitted to the center. If the continuous test structure has no change, it shows that the carrier is not inserted into the housing, and after a period of time, if the signal still has no change, it may be in a stand-by state, saving power. The light emitted by the optical element 406 irradiates on the testing element once the carrier is inserted into the right position of the housing; generally, the testing element is white, and the reflected light is received by PD to form a new signal, indicating that the carrier is inserted into the housing, capable of reading the test result, and the reading structure is started. Irradiation is performed again when the carrier is automatically popped out by the housing; the formed signal is the same as the signal without insertion, which indicates that the carrier has been separated from the housing, thus completing the reading of a test result for once.

Carrier and Housing

The carrier 13 may enter into the housing 30 via a socket 39. The carrier 13 keeps stable after being completely inserted into the housing 30; and the carrier 13 is located in the same position for each insertion, which can ensure that the first light-emitting element 406 and the second light-emitting element are always in contact with the testing area of the testing element 10 during each insertion, thus avoiding the failure of reading a test result due to slanting insertion. Preferably, the housing 30 is provided with a second limiting structure 40, and a through hole 43 is disposed inside the second limiting structure 40; the carrier 13 is inserted into the position of the through hole 43; width and height of the through hole 43 are matched with the insertion portion of the carrier 13 such that the carrier 13 is limited in the second limiting structure 40 after being inserted, which is less liable to sway. Specifically, the second limiting structure 40 includes a first limiting element 41 and a second limiting element 42; the first limiting element 41 and the second limiting element 42 are assembled to form the second limiting structure 40; the second limiting element 42 is directly mounted on the first housing 31 or the second housing 32; the first limiting element 41 is mounted on the second limiting element 42, and the PCB circuit board 33 is mounted on the first limiting element 41. Further, in the present invention, the second limiting structure 40 not only has the role of limiting the motion of the carrier 13, but also has the role of positioning the testing area of the testing element 10 in the carrier 13. Specifically, the first end 35 of the PCB circuit board 33 is mounted on the first limiting element 41; the first limiting element 41 is provided with a through hole 44 matched with first light-emitting element and the second light-emitting element such that the first limiting element 41 is free of blocking the light emitted by the first light-emitting element and the second light-emitting element.

Preferably, the first limiting element 41 is provided with a second limiting structure 45; the second limiting structure 45 is mainly a structure used for positioning such as, a bulge, a groove, a column, and hole; accordingly, the first end 35 of the PCB circuit board 33 is provided with a fifth limiting structure 46; the fifth limiting structure 46 is matched with the second limiting structure 45 such that the first end 35 of the PCB circuit board 33 may be firmly fixed on the first limiting element 41; for example, when the second limiting structure 45 is a bulge structure, the fifth limiting structure 46 has a corresponding groove structure, for another example, when the second limiting structure 45 is a columnar structure, the fifth limiting structure 46 has a hole structure. The specific structures of the second limiting structure 45 and the fifth limiting structure 46 are not the key points of the present invention as long as the two structures may be assembled and matched with each other to achieve free of relative motion. Therefore, the specific structures of the second limiting structure 45 and the fifth limiting structure 46 will be not described in detail, and may be self-designed by a person skilled in the art.

Preferably, the first limiting element 41 and/or the second limiting element 42 is U-shaped such that the first limiting element 41 and the second limiting element 42 are assembled to form a through hole 43 for the carrier to pass through.

Figure 7:
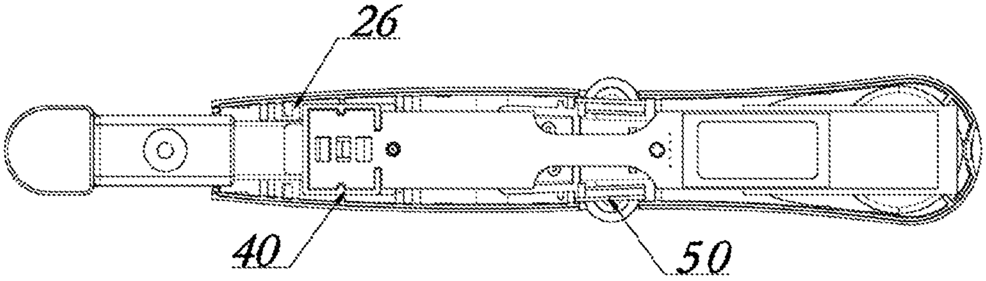
FIG. 7 is a top view showing that the carrier is fixed on a second housing via a locking component.

Preferably, the second limiting structure 40 is limited in the housing 30 to be unmovable; the first limiting element 41 and the second limiting element 42 are limited to the housing 30 to be unmovable. In this example, the overall structure of the second limiting structure 40 is a shape with a wide middle part and narrow both sides. By referring to FIG. 7, the housing 30 is provided with a fourth limiting structure 26; the fourth limiting structure 26 is matched with the second limiting structure 40 in shape; the fourth limiting structure 26 is preferably integrated with the housing 30. The outer shape of the second limiting structure 40 and the inner structure of the fourth limiting structure 26 are designed in pairs; the detailed structures are not key points of the present invention as long as the second limiting structure 40 may be mounted into the fourth limiting structure 26 to be unmovable. Therefore, the detailed outer shape of the second limiting structure 40 and the detailed inner structure of the fourth limiting structure 26 will be not described in detail and may be self-designed by a person skilled in the art.

Further, the carrier 13 needs to be kept stable during the process of being inserted into the housing 30, and the insertion depth of the carrier 13 into the housing 30 further needs to be limited. Because when the insertion depth of the carrier 13 is uncertain, it is not determined whether the first light-emitting element and the second light-emitting element correspond to the testing area on the testing element 10. Therefore, preferably, the housing 30 is provided with a blocking structure 49; the blocking structure 49 makes the carrier 13 abutted against the blocking structure 49 after being inserted into a certain depth, therefore, the carrier 13 may not be continuously inserted (it should be noted that the abutting herein includes the direct abutting and the indirect abutting; the failure of continuous insertion includes that the carrier 13 may not be continuously inserted and the carrier 13 may be continuously inserted into a certain depth, but return to the initial position due to the action of a certain force after insertion. Generally, the direct abutting corresponds to the situation that the carrier 13 may not be continuously inserted; and the indirect abutting corresponds to the situation that the carrier 13 may be continuously inserted into a certain depth, but return to the initial position due to the action of a certain force after insertion. The indirect abutting form will be described in detail hereafter.)

Preferably, the housing 30 is provided with a locking structure; when the carrier 13 is abutted against the blocking structure 49, the position of the carrier 13 is locked by the locking structure, and at this time, the carrier 13 may not be pull out/inserted continuously to achieve a locking position in the housing 30. In the locking state, the carrier 13 may be not movable, which may ensure that the first light-emitting element and the second light-emitting element are always aligned at the testing area on the testing element 10.

Preferably, in the present invention, to reduce the number of components in the housing 30 and for the convenience of the assembly of the test device, the locking structure and the blocking structure 49 are integrated, or the locking structure and the blocking structure 49 are the same component, which is collectively referred to a locking component 50. The locking component 50 includes a buckle 51; the carrier 13 is provided with a slot 25; when the carrier 13 is inserted and abutted against the locking component 50, the buckle 51 may be buckled into the slot 25, thus achieving the locking of the carrier 13. One side of the buckling position 28 of the buckle 51 is a cambered surface, and another side thereof is a vertical plane. The shape of the buckle 51 is conventionally designed in the art and will be not described any more. Further, the locking component 50 includes two buckles 51; the two buckles 51 are disposed relatively, accordingly, the carrier 13 is provided with two slots 25; the two buckles 51 are respectively locked with the two slots 25 such that the carrier 13 is locked in the housing 30 more firmly. When one end of the carrier is inserted into the socket of the housing, one end with the slot 25 enters into the locking component. Symmetric buckles in the locking component are generally elastic; therefore, once the slot is in contact with the buckle, there is a force of elasticity to press the carrier to be in a fixed position.

Pop-Up Component

Because the position of the carrier 13 is locked by the locking structure, and the locking structure is located in the housing 30, the operator may not unlock the locking structure outside the housing 30 such that the carrier 13 is always in the locking state after being locked. After test results are read out via a display screen at the end of the test, the carrier is desired to be separated from the housing for the next testing. At this time, the carrier is desired to be smoothly separated from the housing. At this time, the carrier is locked by the locking structure, and unlocking needs to be performed. Preferably, the locking structure is provided with an unlocking structure 53; the unlocking structure 53 is exposed outside the housing 30, and the operator unlock the position of the carrier 13 by pressing the unlocking structure 53 outside the housing 30. Specifically, because the locking structure and the blocking structure 49 are the same component, and collectively referred to as a locking component 50. The locking component 50 (a locking structure) is provided with an unlocking structure, namely, the locking structure, the blocking structure 49 and the unlocking structure are integrated. Further, the locking component 50 is provided with a supporting point structure 52; the buckle 51 is connected with the supporting point structure 52; the unlocking structure 53 and the buckle 51 are respectively located at both sides thereof; the supporting point structure 52 is located between the unlocking structure 53 and the buckle 51, thus forming a lever structure with the supporting point structure 52 as the center; the unlocking structure 53 is pressed to pop up the buckle 51 from the slot 25, thus achieving the unlocking.

To ensure the effect of popping up the buckle 51 by pressing the unlocking structure 53, the position of the supporting point structure 52 needs to be kept fixed in the housing 30; if the supporting point structure 52 is movable in the housing 30, the unlocking structure 53 is pressed to preferably drive the supporting point structure 52 to move instead of popping up the buckle 51. Specifically, the housing 30 is provided with a first fixed column 26; the first fixed column 26 is used for fixing the locking component 50; the supporting point structure 52 of the locking component 50 is connected with a first connecting structure 54, and the first connecting structure 54 is connected with a first hollow body 55; the first hollow body 55 is internally provided with a hole externally paired with the first fixed column 26 such that the first hollow body is sleeved on the first fixed column 26 and the position of the supporting point structure 52 is fixed. (The fixation herein refers that the position of the supporting point structure 52 keeps fixed without the action of external force; and under the action of external force, the position of the supporting point structure 52 may generate corresponding offset relative to the initial position.)

Further, the housing 30 is also provided with a second fixed column 27; the second fixed column 27 is used for fixing the locking component 50 better on the basis of the first fixed column 26; the first hollow body 55 is connected with a second connecting structure 56; the second connecting structure 56 is connected with a second hollow body 57; the second hollow body 57 is internally provided with a hole externally paired with the second fixed column 27 such that the second hollow body is capable of being sleeved on the second fixed column 27. Compared with the locking component 50, it is fixed on the housing 30 only via the paired design of the first hollow body 55 and the first fixed column 26. Such a configuration may further limit the possible relative rotation in the positions of the first hollow body 55 and the first fixed column 26 such that the locking component 50 in the housing 30 is fixed more firmly. The locking component 50 is fixed firmly, which means that the position of the supporting point structure 52 may be kept fixed as much as possible. In this way, when the unlocking structure 53 is pressed, it is bound to cause the popup of the buckle 51, thus achieving the unlocking.

The first connecting structure 54 and the second connecting structure 56 are plate-like structures, but there exists a difference: the first connecting structure 54 is a structure formed by connecting the supporting point structure 52 with the first hollow body 55; when the unlocking structure 53 is pressed to unlock, deformation generally occurs on the first connecting structure 54 (including a position where the first connecting structure 54 and the buckle 51 are connected, and a position where the first connecting structure 51 and the first hollow body 55 are connected). Therefore, the first connecting structure 54 should be not too thick or too thin; too thick structure is prone to limiting the deformation of the first connecting structure 54; too thin structure will cause the fracture of the first connecting structure 54 during deformation; the thickness of the first connecting structure 54 ranges from 0.3 mm-3 mm, preferably, 0.8 mm-2 mm. The second connecting structure 56 is a structure formed by connecting the first hollow body 55 with the second hollow body 57; the structure mainly functions to make the locking component 50 kept fixed in the housing 30. Therefore, the thickness of the structure is not specifically limited as long as the first hollow body 55 is kept connected with the second hollow body 57. Certainly, a little too thick second connecting structure 56 is also available; the thickness of the second connecting structure 56 is not limited; the increased thickness is helpful to improve the connective stability between the first hollow body 55 and the second hollow body 57.

Preferably, when some operators press the unlocking structure 53 excessively, it is easy to cause continuous deformation after the buckle 51 has been unlocked. This is easy to cause the fracture of the buckle 51, resulting in the damage of the locking component 50, which thus makes the operators mistakenly thinking of poor product quality. To avoid the fracture due to the excessive deformation of the buckle 51, a bulge structure 58 is disposed on one side of the buckle 51 facing away from the buckling position 28. When the buckle 51 deforms to a certain extent, the bulge structure 58 on the buckle 51 will be abutted against the inner wall of the housing 30 such that buckle 51 is unable to continue the deformation, thus achieving the prevention of fracture. Moreover, the unlocking structure 53 should be not excessively pressed; extending bodies 450,451 are extended at both sides of the second hollow body 57, and the two extending bodies are not in contact with the unlocking structure 53, but there is a distance reserved; the extending body 451 may limit the pressing distance of the unlocking structure 53 once the unlocking structure 53 is pressed, and similarly, another extending body 450 limits the distance of the unlocking structure 47. The distance of the unlocking structure 53 is limited by dual-limiting action (the extending body 450 is designed as a bulge structure 58) such that even though different operators exert different force on result structures 53,47, the moving distance of the result structure 53 is constant. Meanwhile, the result structure 53 is generally molded for one time. In case of multiple repeated unlocking, if elastic deformation is lost to cause the failure of the unlocking, the service life is shortened, for example, the moving distance of the multiple different unlocking structure 53 is different, possibly resulting in different deformations of the first connecting structure 54.

The unlocking structure 53 includes an unlocking portion 46 and a pressing portion 47; the pressing portion 47 is disposed on the unlocking portion 46; force may be transferred onto the unlocking portion 46 by pressing the pressing portion 47; the unlocking portion 46 moves to drive the first connecting structure 54 to deform; the deformation of the first connecting structure 54 will cause the popup of the buckle 51 to achieving unlocking, or open the buckle to release the carrier. The unlocking structure 53 will be directly pressed by fingers in use, in particular to the unlocking portion 46 in the unlocking structure 53; the structure will perform frequent deformations (motion) to achieve unlocking. To prolong the service life of the test pen, the damage of the unlocking portion 46 is a problem to be taken into consideration. Preferably, the unlocking portion 46 is arc-shaped, and the cambered surface of the unlocking portion 46 faces outward. Relative to a square unlocking portion 46, the arc-shaped unlocking portion 46 may partially decompose force onto the arc-shaped cross section, while the square unlocking portion 46 completely transmit force to the connecting position of the unlocking portion 46 and the supporting point structure 52. Such configuration makes the arc-shaped unlocking portion 46 not prone to fracture. Moreover, the arc-shaped unlocking portion 46 is more adhered to the housing 30.

Figure 8:
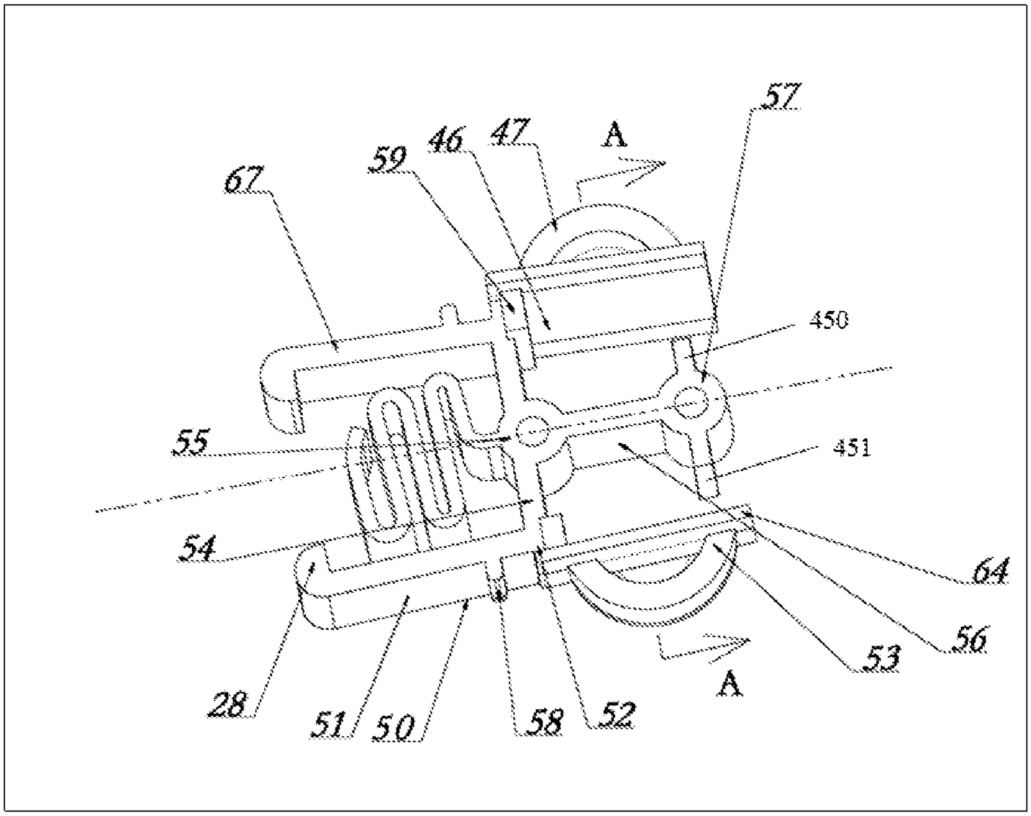
FIG. 8 is a structure diagram of the locking component.
Figure 9:
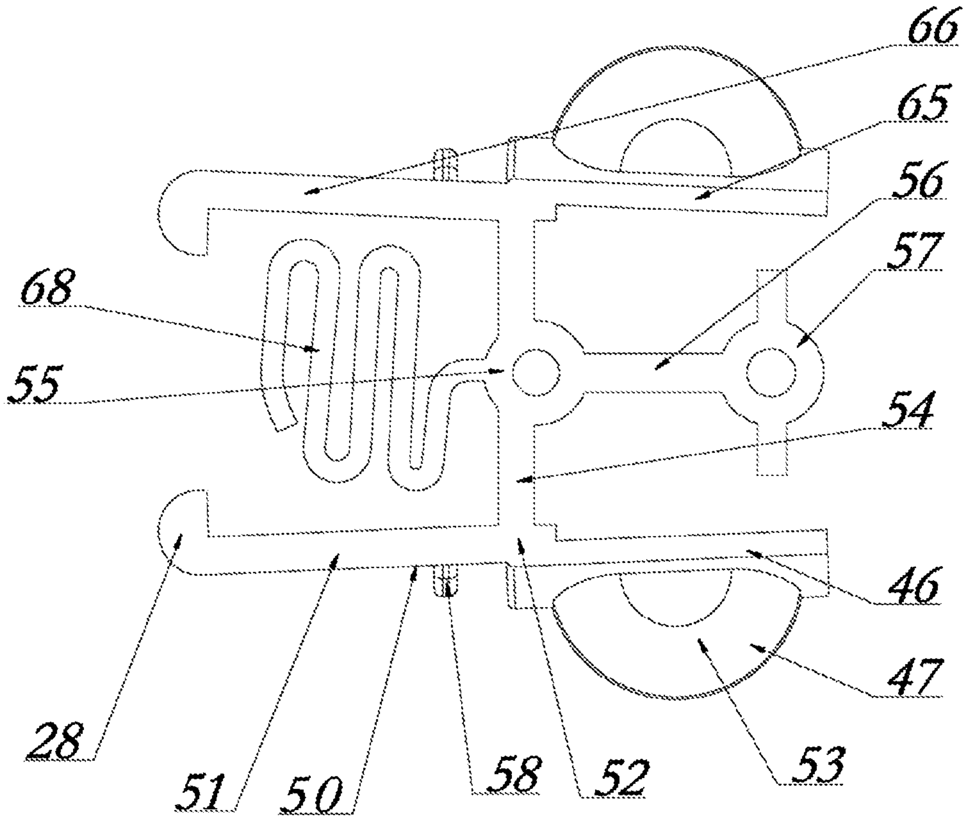
FIG. 9 is a top view showing the locking component.
Figure 10:
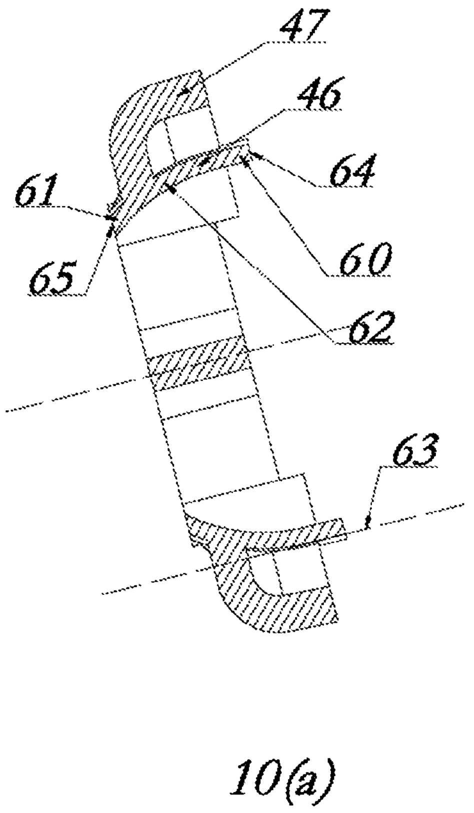
FIG. 10 is a sectional view of two different locking components in a direction of "A-A" of FIG. 8.

Further, the arc-shaped unlocking portion 46 includes an inner side with an arc center facing the unlocking structure 53 and an outer side with an arc center facing the unlocking structure. Such two shapes of unlocking portion 46 may be applied in the unlocking structure 53 of the present invention. Relatively, unlocking portion 46 having the inner side with the arc center facing the unlocking structure is preferred. Because the arc-shaped structure at the edge of the outer contour of the housing 30 is also a way with the arc center facing inward. Therefore, the unlocking portion 53 with the arc center facing inward of the unlocking portion 46 may be more matched with the inner space of the housing 30. Furthermore, the cross section of the unlocking portion 46 is divided into a first edge 61 and a second edge 60, and a middle portion 62. The present invention describes the three structures to reflect the different structures of the unlocking portion 46. As shown in FIG. 10, the unlocking structure 53 with the arc center facing inward of the unlocking portion 46 is characterized in that: as shown in FIG. 10(*a*), a distance from one of the first edge 61 or the second edge 60 to the center is the shortest (the center is the central axis position to divide equally the locking component 50, as shown in FIG. 8); and a distance from the other of the first edge and the second edge to the center is the farthest; and a distance from the middle portion 62 to the center ranges between a distance from the first edge 61 to the center and a distance from the second edge 60 to the center; as shown in FIG. 10(*b*), a distance from the middle portion 62 to the center is the farthest; a distance from the first edge 61 to the center and a distance from the second edge 60 to the center is smaller than the distance from the middle portion 62 to the center. Compared with the technical solutions of FIG. 10(*a*) and FIG. 10(*b*), the technical solution of FIG. 10(*a*) is preferred. Because for the technical solution of FIG. 10(*b*), the middle portion 62 is a protruding portion of the arc-shaped structure; when the portion is in direct contact with the pressing portion 47, force may be partially decomposed onto the arc-shaped cross section by both sides of the arc-shaped structure such that it feels "hard" when the unlocking portion 46 is pressed, which is hard to complete unlocking by press. In the technical solution of FIG. 10(*a*), force may be decomposed by only one side of the arc-shaped structure during pressing process such that it feels "softer" when the unlocking portion 46 is pressed, which is easy to complete unlocking by press. Furthermore, when the test pen is horizontally placed on a table top, namely, the top surface or bottom surface of the housing 30 of the test pen is in contact with the desk top, a tangent line 63 of the edge position of an arc formed by the first edge 61, the middle portion 62 and the second edge 60 is kept vertical or near vertical to the horizontal plane. The vertical or the near vertical refers that the angle between the tangent line 63 and the horizontal plane ranges within 75° to 90°. In this way, it is very easy to press the unlocking structure 53, and the pressing effect is obvious to complete unlocking readily, and the service life is long.

Further, a reinforced structure 59 is disposed at a position where the unlocking portion 46 and the supporting point structure 52 are connected. The reinforced structure 59 makes the position where the unlocking portion 46 and the supporting point structure 52 not prone to fracture because the connecting position is subjected to stress at most.

Preferably, for the convenience for the operator to press the pressing portion 47 by hands, the outer contour of the pressing portion 47 is arc-shaped. The arc-shaped pressing portion 47 makes the operator free of bumping against the tip of a similar square outline during pressing process, thus greatly improving the pressing comfort level.

To improve the unlocking feedback sensitivity of the buckle 51 when pressing the unlocking structure 53 and to achieve the unlocking of the carrier 13 with proper intensity of force by the operator instead of forced press, preferably, at least one surface on the unlocking portion 46 is coplanar with a surface on the buckle 51; when there is a co-plane, the unlocking portion 46 and the buckle 51 are associated or linked better; when the unlocking structure 53 is pressed, it is more prone to driving the buckle 51 to achieve synchronous unlocking. Specifically, the unlocking portion 46 includes a first side face 64 and a second side face 65; the first side face 64 and the second side face 65 are respectively located at a position close to the second edge 60 and the first edge 61; and the buckle 51 also includes a third side face 66 and a fourth side face 67; where the first side face 64 and the second side face 65 of the unlocking portion 46 are kept in the same plane with the third side face 66 and the fourth side face 67 of the buckle 51. Furthermore, the first side face 64 and the second side face 65 of the unlocking portion 46 are kept in the same plane with the third side face 66 and the fourth side face 67 of the buckle 51. In this example, the second side face 65 of the unlocking portion 46 is in the same plane with the third side face 66 of the buckle 51. Such design makes the lower plane of the unlocking structure 53 capable of being in the same plane; when the unlocking portion 46 is mounted in the housing 30, the unlocking portion 46 may be mounted better and more conveniently.

By the above structure, when the operator desires to take out the carrier 13, the unlocking structure 53 only needs to be pressed to complete the unlocking of the carrier 13, and the carrier 13 gets back to the active state; but since there is no external force for assistance at this time, the carrier 13 still retains in the test pen and needs to pull out by the operator manually. Preferably, for the convenience of taking out the carrier 13, the test pen further includes an elastic structure 68. The elastic structure 68 should be disposed between the blocking structure 49 and the carrier 13, in this way, when the blocking structure 49 is abutted against the carrier 13, the elastic structure 68 located between the two is compressed. Meanwhile, the position of the carrier 13 is locked by the locking structure, the elastic structure 68 is always in the compressed state to accumulate elastic potential energy, thus achieving the position locking in the housing 30. When the carrier 13 needs to be unlocked, the unlocking structure 53 is pressed. Because the elastic structure 68 accumulates elastic potential energy, unlocking is performed at this time to release elastic potential energy, which may automatically pop up the carrier 13 from the housing. A person skilled in the art should choose the elastic structure 68 as required such that the carrier 13 will not fall off due to excessive popup, or it is inconvenient to pull out the carrier 13 due to insufficient popup distance.

Preferably, in some examples, the elastic structure 68 is independent, namely, the elastic structure 68 is neither connected with the carrier 13, nor connected with the locking component 50, and it is an independent component. Such a configuration mode may achieve the unlocking popup function of the carrier 13, but the spring is independent, which is more troublesome during the assembly of the test pen. In some other examples, the elastic structure 68 is integrated with the carrier 13. More specifically, the elastic structure 68 is integrated with one end of the test pen, for example, the elastic structure 68 is integrated with the first housing 31 and/or the second housing 32 of the carrier 13. Such a configuration mode reduces the number of components of the test pen, but there exists the shortcoming, namely, the carrier 13 is connected with the elastic structure 68, and when the carrier 13 is taken out, the elastic structure 68 is also exposed, which is not beautiful. In some other examples, the elastic structure 68 is integrated with the blocking structure 49, which is the embodiment chosen in this example. The elastic structure 68 is located inside the housing 30 and not exposed; the elastic structure 68 is integrated with the blocking structure 49, convenient for production and installation, which is a preferred embodiment (as shown in the figure). It should be noted that the above mentioned blocking structure 49 is abutted against the carrier 13, which includes that the blocking structure 49 is directly abutted against the carrier 13, and blocking structure 49 is indirectly abutted against the carrier 13, just like in this example, the elastic structure 68 on the blocking structure 49 is indirectly abutted against the carrier 13.

The elastic structure 68 is not only integrated with the blocking structure 49, but also integrated with the locking component 50. The elastic structure 68 is integrated with the blocking structure 49, which should be construed as including the following technical solution: the elastic structure 68 is made of a material A, and the blocking structure 49 is made of a material B; the elastic structure 68 is integrated with the blocking structure 49 and not separated from each other in use. The elastic structure 68 is integrated with the locking component 50, which should be construed as including the following technical solution: the elastic structure 68 and the blocking structure 49 are made of the same material; further in the machining process, the elastic structure 68 and the blocking structure 49 are integrated as a component; at this time, the "elastic structure 68" and "blocking structure 49" should be construed as two different portions on the locking component 50. Such an integrated mode, in particular to the integrated injection molding mode, reduces the number of components in the test pen, and is convenient for the production, and assembly of the test device, suitable for the rapid production, manufacture and assembly demands for the test pen. It is very necessary to improve the production efficiency and yield in the pandemic period of novel coronavirus.

To satisfy the demands for the integration, better elasticity and long service life of the elastic structure 68, preferably, the elastic structure 68 is a component having a certain thickness and being in a bending shape, and a gap is retained between the bending portion thereof, and the overall locking component 50 is made of plastic.

It should be noted that the feature "the elastic structure 68 is integrated with the blocking structure 49" in the above description should be not construed as "the elastic structure 68 is only integrated with the blocking structure 49". In the example of the present invention, the locking structure, the blocking structure 49, the unlocking structure and the elastic structure are integrated, which is not repeatedly described in the present invention. For example, "the elastic structure is integrated with the blocking structure", "the blocking structure 49 is integrated with the unlocking structure", and the like. A person skilled in the art can readily deduce other connection relations. Similarly, directed to the description of some components, for example, the component A is fixed, and the component B is rigidly connected with the component A, a person skilled in the art can also deduce some conclusions, such as, the component is also fixed, there is no repeated description in the present invention.

What are described above are merely detailed embodiments of the present invention, but the protection scope of the present invention is not limited thereto. Any change or replacement envisaged without any inventive labor shall fall within the protection scope of the present invention. Therefore, the protection scope of the present invention shall be subjected to the protection scope defined in the claims.

The present invention as shown and set forth in this text may be achieved in case of lacking any element and limitation disclosed herein specifically. Terms and expression methods used herein are used for description, but not for limitation. Further, it is undesired that any equivalent of the features or a portion thereof as shown or set forth herein is excluded in the use of these terms and expression methods; moreover, a person skilled in the art should realize that various modifications are feasible within the scope of the present invention. Therefore, it should be understood that the present invention is disclosed through various examples and optional features; but any amendment and variation on the concept herein can be used by a person skilled in the art. Moreover, these amendments and variations should be construed as falling within the scope of claims of the present invention.

Articles, patents, patent applications set forth or disclosed herein, as well as all other documents and contents of the electronically available information should be included herein in full text for reference to some extent, just as each individual publication is specifically and separately pointed out for reference. The Applicant reserves the right to incorporate any and all materials and information from this article, patent, patent application or other documents into the present application.

The invention claimed is:

1. A test device, comprising a housing and a carrier, wherein the housing and the carrier are detachable; the housing is provided with a socket, and the carrier contains a testing element, and the carrier along with the testing element therein is capable of being inserted into the housing through the socket;

wherein, the housing is provided with a blocking structure and a locking structure; the blocking structure and the locking structure are integrated to form a locking component; when the carrier is inserted into the housing, and a position of the carrier is locked by the locking structure, the carrier is abutted against the blocking structure;

wherein the step of abutting the carrier against the blocking structure comprises that the carrier is directly and indirectly abutted against the blocking structure;

wherein the test device further comprises an unlocking structure, and a portion of the unlocking structure is exposed outside the housing;

wherein the unlocking structure is disposed on the locking structure; the locking structure, the blocking structure and the unlocking structure are integrated;

wherein the locking component comprises a buckle, and the carrier is provided with a slot, and the buckle is capable of being buckled into the slot, thus achieving the locking of the carrier;

wherein the locking component is provided with a supporting point structure; the buckle is connected with the supporting point structure; the unlocking structure and the buckle are respectively located at both sides of the supporting point structure; the supporting point structure is located between the unlocking structure and the buckle;

wherein the housing is provided with a first fixed column; the first fixed column is used to fix the locking component; the supporting point structure of the locking component is connected with a first connecting structure; the first connecting structure is connected with a first hollow body; the first hollow body is internally provided with a hole externally paired with the first fixed column in the housing such that the first hollow body is capable of being sleeved on the first fixed column;

wherein the housing is provided with a second fixed column; the first hollow body is connected with a second connecting structure; the second connecting structure is connected with a second hollow body; the second hollow body is internally provided with a hole externally paired with the second fixed column such that the second hollow body is capable of being sleeved on the second fixed column.

2. The test device according to claim 1, wherein a position where the buckle is buckled into the slot is a buckling position; a bulge structure is disposed on one side of the buckle facing away from the buckling position; when the buckle has excessive deformation, the bulge structure on the buckle is capable of being abutted against an inner wall of the housing, thus preventing the buckle from excessive deformation.

3. The test device according to claim 1, wherein the unlocking structure comprises an unlocking portion and a pressing portion; the pressing portion is disposed on the unlocking portion; and the pressing portion is exposed outside the housing for an operator to exert pressure.

4. The test device according to claim 3, wherein the unlocking portion is arc-shaped; the arc-shaped unlocking portion comprises an inner side with an arc center facing the unlocking structure and an outer side with an arc center facing the unlocking structure.

5. The test device according to claim 4, wherein a cross section of the unlocking portion is divided into a first edge, a second edge and a middle portion; the unlocking structure with the arc center facing the inner side of the unlocking portion is characterized in that: a distance from one of the first edge or the second edge to the center is the shortest, and a distance from the other of the first edge and the second edge to the center is the farthest; and a distance from the middle portion to the center ranges between a distance from the first edge to the center and a distance from the second edge to the center;

and a distance from the middle portion to the center is the farthest; the distance from the first edge to the center and the distance from the second edge to the center are both smaller than the distance from the middle portion to the center.

6. The test device according to claim 5, wherein when the distance from one of the first edge or the second edge to the center is the shortest, and the distance from the other of the first edge and the second edge is the farthest; and the distance from the middle portion to the center ranges between the distance from the first edge to the center and the distance from the second edge to the center;

and when the housing is placed horizontally on a table, a tangent line of an edge position of an arc formed by the first edge, the middle portion and the second edge is kept vertical or near vertical to the horizontal plane.

7. The test device according to claim 1, wherein the unlocking structure comprises an unlocking portion and a pressing portion; the pressing portion is disposed on the unlocking portion; and a reinforced structure is disposed at a position where the unlocking portion and the supporting point structure are connected.

8. The test device according to claim 7, wherein at least one surface on the unlocking portion is coplanar with a surface on the buckle;

the unlocking portion comprises a first side face and a second side face; the first side face and the second side face are respectively located at a position close to the second edge and the first edge; and the buckle further comprises a third side face and a fourth side face;

where one of the first side face and the second side face of the unlocking portion are kept in the same plane with one of the third side face and the fourth side face of the buckle, and the first side face and the second side face of the unlocking portion are kept in the same plane with the third side face and the fourth side face of the buckle; alternatively, the second side face of the unlocking portion and the third side face of the buckle are in the sample plane; and the first side face of the unlocking portion and the fourth side face of the buckle are not in the same plane.

9. The test device according to claim 7, wherein the housing further comprises an elastic structure; the elastic structure is disposed between the blocking structure and the carrier; when the carrier is inserted into the housing and locked with the locking structure, the elastic structure is compressed.

10. The test device according to claim 9, wherein the unlocking structure, the elastic structure, the blocking structure and the unlocking structure are integrated.

11. The test device according to claim 9, wherein the elastic structure is a component having a certain thickness and being in a bending shape, and a gap is retained within a bending portion thereof.

12. The test device according to claim 9, wherein a pressure is exerted to the unlocking structure when unlocking is required, thus unlocking the carrier such that an elastic element enables the carrier to be separated from the housing automatically by elastic force.

13. The test device according to claim 1, wherein the housing comprises an electronic element for reading a test result in a testing area of the testing element; the electronic element comprises a light-emitting element and a receiving element for receiving a reflected light of the testing area.

* * * * *